(12) United States Patent
Amenta

(10) Patent No.: US 6,342,917 B1
(45) Date of Patent: Jan. 29, 2002

(54) IMAGE RECORDING APPARATUS AND METHOD USING LIGHT FIELDS TO TRACK POSITION AND ORIENTATION

(75) Inventor: Annamaria B. Amenta, Austin, TX (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/007,776

(22) Filed: Jan. 16, 1998

(51) Int. Cl.$^7$ ............................................... H04N 5/225
(52) U.S. Cl. .......................... 348/207; 348/36; 348/231
(58) Field of Search ................................. 348/207, 222, 348/232, 272, 169, 239, 294, 311, 231, 218, 36, 37, 38, 39; 382/154, 106, 141; H04N 5/225

(56) References Cited

U.S. PATENT DOCUMENTS

| | | | | |
|---|---|---|---|---|
| 5,900,909 A | * | 5/1999 | Parulski et al. | 348/232 |
| 6,011,585 A | * | 1/2000 | Anderson | 348/272 |
| 6,192,145 B1 | * | 2/2001 | Anandan et al. | 348/154 |
| 6,195,122 B1 | * | 2/2001 | Vincent | 348/169 |

FOREIGN PATENT DOCUMENTS

EP        0 537 021 A2     4/1993

OTHER PUBLICATIONS

EPO Search Report, May 17, 1999.*
"Light Filed Rendering", Marc Levoy et al., Proceedings of $23^{rd}$ International Conference on Computer Graphics and Interactive Techniques (SIGGRAPH '96), Aug. 4–9, 1996, pp. 1–6.
"The Lumigraph", Steve J. Gortler et al., Proceedings of $23^{rd}$ International Conference on Computer Graphics and Interactive Techniques (SIGGRAPH '96), pp. 1–10.
Edward H. Adelson et al., "Single Lens Stereo with a Plenoptic Camera", IEEE Transactions on Pattern Analysis and Machine Intelligence, vol. 14, No. 2, pp. 99–106, Feb., 1992.
John Cardillo et al., "3–D Position Sensing Using a Passive Monocular Vision System", IEEE Transactions on Pattern Analysis and Machine Intelligence, vol. 13, No. 8, pp. 809–813, Aug., 1991.

* cited by examiner

*Primary Examiner*—Tuan Ho
(74) *Attorney, Agent, or Firm*—Oliff & Berridge, PLC

(57) ABSTRACT

The invention provides a simple method and apparatus for tracking image recording device motion using a light field. The invention locates the image recording device's position and orientation in each frame very precisely by checking the radiance seen along lines captured in previous frames. The invention provides an interactive system that provides the operator with feedback, to capture a sequence of frames that sufficiently cover the light field, to provide sufficient data for reconstruction of three-dimensional structures.

21 Claims, 8 Drawing Sheets

IMAGE RECORDING APPARATUS AND METHOD USING LIGHT FIELDS TO TRACK POSITION AND ORIENTATION

BACKGROUND OF THE INVENTION

1. Field of Invention

The invention relates to an apparatus and method for image-based rendering. In particular, the invention relates to an apparatus and method for tracking camera motion using a light field in order to provide data for later reconstruction of a three-dimensional structure or environment.

2. Description of Related Art

The computer graphics industry has become increasingly interested in methods by which three-dimensional objects or environments can be represented using a large collection of two-dimensional images. This is referred to as image-based rendering. One way in which to represent an object or environment is to use light fields.

A light field is any representation of a three-dimensional scene by the radiance induced on the set of incident lines in three-dimensional free space $R^3$. This includes, but is not limited to, representations which sample and store this radiance as a collection of two-dimensional images and representations which sample and store this radiance in a data structure representing lines in three-dimensional free space $R^3$.

For example, If the two-dimensional images of the object or environment are sampled densely at a two-dimensional set P of camera positions, the radiance seen along all the lines passing through P has been sampled. These radiances can be stored, for example, in a four-dimensional array where each element corresponds to a line in three-dimensional free space $R^3$. Any image of the object from a three-dimensional set of positions can be reconstructed by collecting the appropriate lines from this array. Such a representation is referred to as a light field.

A light field is best understood with reference to FIG. 1 and the following explanation. FIG. 1 shows a light slab representation of a light field. Consider the set of lines passing through two parallel planes $P_1$ and $P_2$ in the three-dimensional free space $R^3$. Each pair of points $p_1$ of the plane $P_1$ and $P_2$ of the plane $P_2$ defines a unique line. Each line, except for those parallel to $P_1$ and $P_2$, defines a unique pair of the points $p_1$ and $P_2$. So the set of all lines in the three-dimensional free space $R^3$ is a four-dimensional space, which can be parameterized by the four coordinates (u,v,s,t) required to specify the points $p_1$ and $p_2$.

The lines through a specific point p in $R^3$ form a two-dimensional subset, which is a plane under this parameterization. An image is a rectangular subset of this "plane of lines" with p as the focal point. space $R^3$ is a four-dimensional space, which can be parameterized by the four coordinates (u,v,s,t) required to specify the points $p_1$ and $p_2$.

The lines through a specific point p in $R^3$ form a two-dimensional subset, which is a plane under this parameterization. An image is a rectangular subset of this "plane of lines" with p as the focal point.

Light fields such as these can be used to reconstruct images by collecting a subset of the four-dimensional space of lines which contain a lot of images of an object. This collection is done by pointing an image recording device at the object and physically scanning the image recording device across a two-dimensional square. A two-dimensional set of lines is collected at each image recording device position. The lines in all the images are parameterized using two parallel planes (one containing the moving camera and the other in front of the object) and stored as a four-dimensional array. The radiance seen along each line in the four-dimensional array is addressed by the line coordinates. An image of the object with the focal point anywhere in the three-dimensional vicinity of the two planes can be extracted by collecting the radiance of each of its lines from this array. In this way, images can be reconstructed in real time.

These light fields can be compressed to a reasonable size and accessed quickly enough to make them useful for real-time rendering on a high-end machine. However, the capturing of these light fields has been limited to mechanically scanning a camera over a two-dimensional plane using such devices as a computer controlled camera gantry. Such a device is disclosed in Levoy et al., "Light Field Rendering", Computer Graphics Proceedings, SIGGRAPH '96, p. 528, 31–42. In these devices, the computer keeps track of the camera position at each frame of the light field capturing process. Such devices are generally expensive, limited to a specific area and range of object sizes it can handle, and require large investments of time and money to produce and use.

Another way in which to capture the light fields is to use fiducial points, points in three-dimensional free space $R^3$ whose exact locations are known with respect to some coordinate frame. Gortler et al., "The Lumigraph", Computer Graphics Proceedings, SIGGRAPH '96, p. 528, 43–54, discloses one method of using fiducial points to obtain images of a three-dimensional environment. In this method, however, it is necessary to have many fiducial points within the environment and to maintain those fiducial points in the image field while capturing each image. Thus, the range of motion of the camera is limited to the area in which a number of fiducial points are present.

Therefore, it would be beneficial and more practical to be able to use a hand-held camera to perform the image capturing of a three-dimensional environment without being constrained to a particular area of movement, i.e. an area containing fiducial points. However, a fundamental difficulty in using a hand-held device is in tracking the position and orientation of the camera at each frame of the image capturing process.

Camera tracking is a problem that arises frequently in computer vision. One technique for camera tracking is to measure the optical flow from one image frame to the next. In this technique, each pixel is assumed to correspond to a nearby pixel with the best-matching color. An overall combination of the pixel motions is interpreted as a motion of the camera. This method provides good results when tracking the motion between two successive image frames. However, for multiple frames, such as is needed for capturing of environments, the error in the camera position accumulates rapidly.

Another technique for camera tracking is the point correspondence method, in which distinctive looking feature points (such as object corners) are extracted from an image and tracked from one image frame to the next. These points act as fiducial points during camera tracking. This method provides better results than the optical flow method, however, it is difficult to track the same three-dimensional points from image frame to image frame and the method itself is rather slow and cumbersome.

Additionally, problems with camera tracking for the capture of images of a three-dimensional environment for later reconstruction of the environment is different from the problem of capturing data from arbitrary video sequences.

The camera operator knows that she or he is trying to capture data of the environment, and is willing to move the camera in particular ways in order to do so. Thus, an interactive data collection system could provide feedback to the camera operator, giving the operator indications for keeping the camera tracking robust and to fill in desired data.

SUMMARY OF THE INVENTION

The invention provides a method and apparatus for tracking the motion of an image recording device. The method and apparatus allow a hand-held image recording device to be used.

The invention also provides a simple method and apparatus for tracking image recording device motion using a light field.

The invention further provides an interactive system that provides the operator with feedback to capture a sequence of frames that sufficiently cover the light field.

The invention additionally provides an interactive system that provides the operator with feedback to provide sufficient data for reconstruction of three-dimensional structures.

The method and apparatus of the invention locates the position and the orientation of the image recording device in each frame by checking the radiance along lines in the frame and corresponding lines in previous frames. Thus, a separate device to keep track of the location of the image recording device is not necessary.

The method and apparatus of the invention locates the image recording device's position and orientation in each frame very precisely by checking the radiance seen along lines captured in previous frames.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
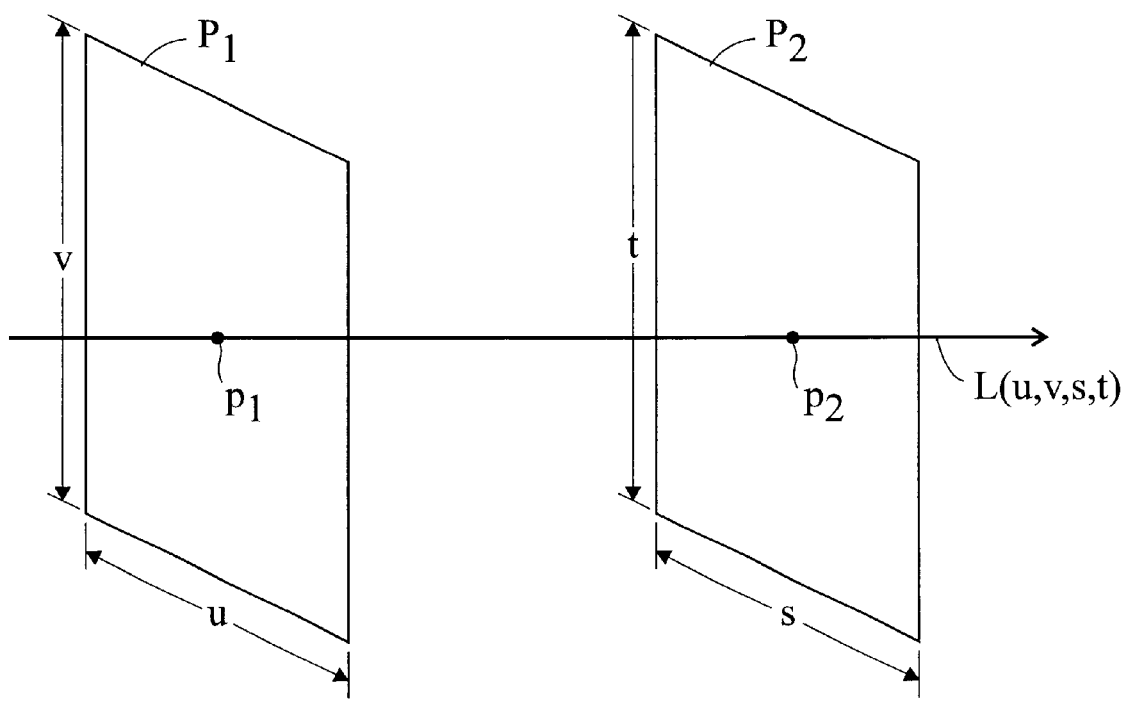
FIG. 1 shows a light slab representation of a light field.
Figure 2:
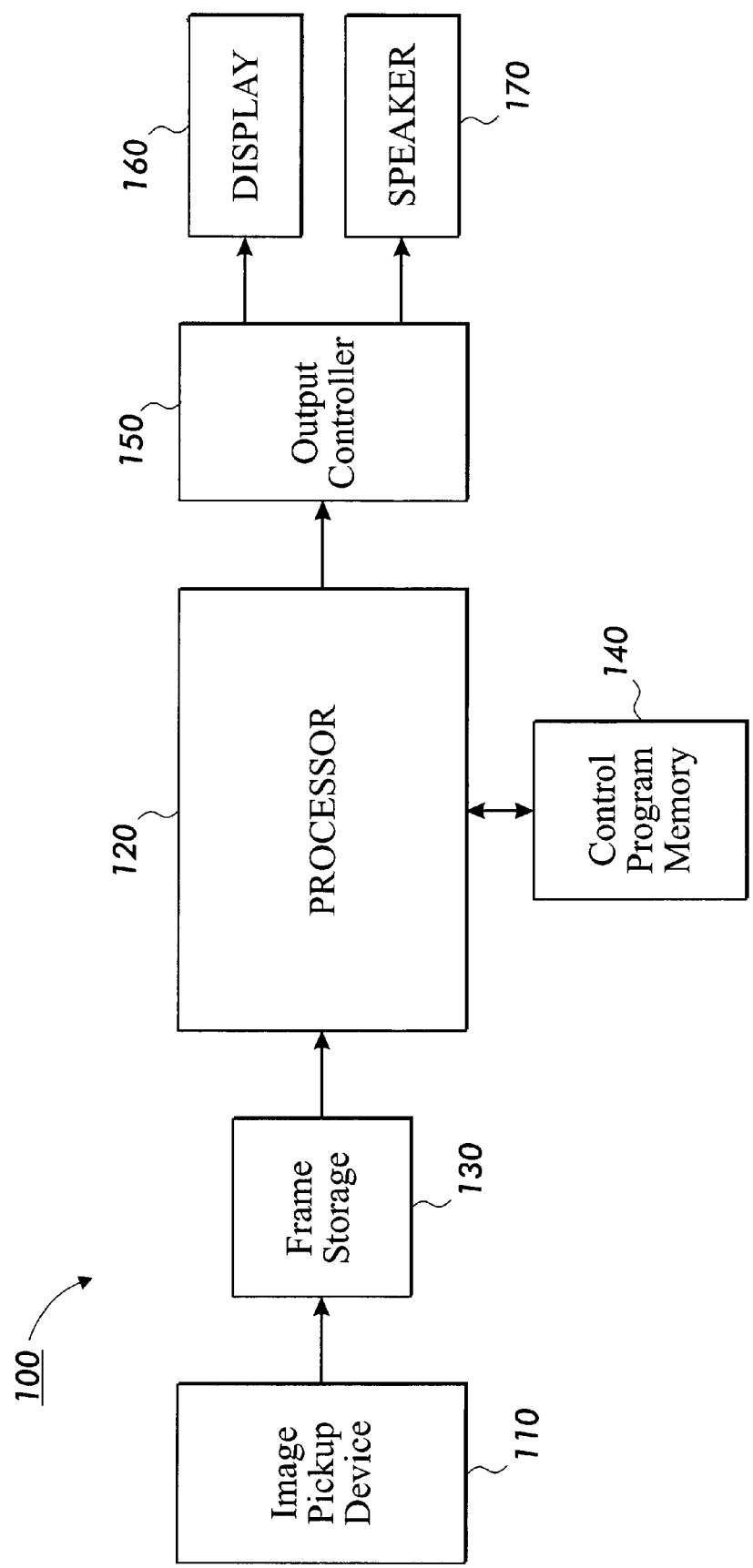
FIG. 2 shows a block diagram of the apparatus of the invention.

FIG. 2 shows an image recording apparatus 100 including an image pickup device 110, a processor 120, a frame storage 130, a memory 140, an output controller 150 and an output device 160. The image pickup device 110 detects an image of the environment in which the image pickup device 110 is operating. This image, once recorded, is a frame. The image pickup device 110 can be a video camera, still photo camera, digital camera, electronic camera, image editing machine, and the like. In one preferred embodiment, the image pickup device 110 is a hand-held camera. Each recorded frame is input to the processor 120, which stores the frames in the frame storage 130. The frame storage 130 may include a videotape, photographic film, a CD-ROM, magnetic media, RAM, a hard drive, a floppy disk and disk drive, flash memory or the like. The frame I' is then sent to the processor 120.

The processor 120 determines a position of the image pickup device 110 for each frame of the sequence of m frames obtained from the image pickup device 110. This may be done using any method by which the position of known points in the image frames are used to determine the relative position of the image pickup device 110. The processor 120 then determines a subset of lines in each frame that pass through the position of the image pickup device 110.

The image pickup device 110 then captures a new frame of image data and sends it to the processor 120. The position and the orientation of the image pickup device 110 in the new frame I is determined as outlined below.

Figure 3:
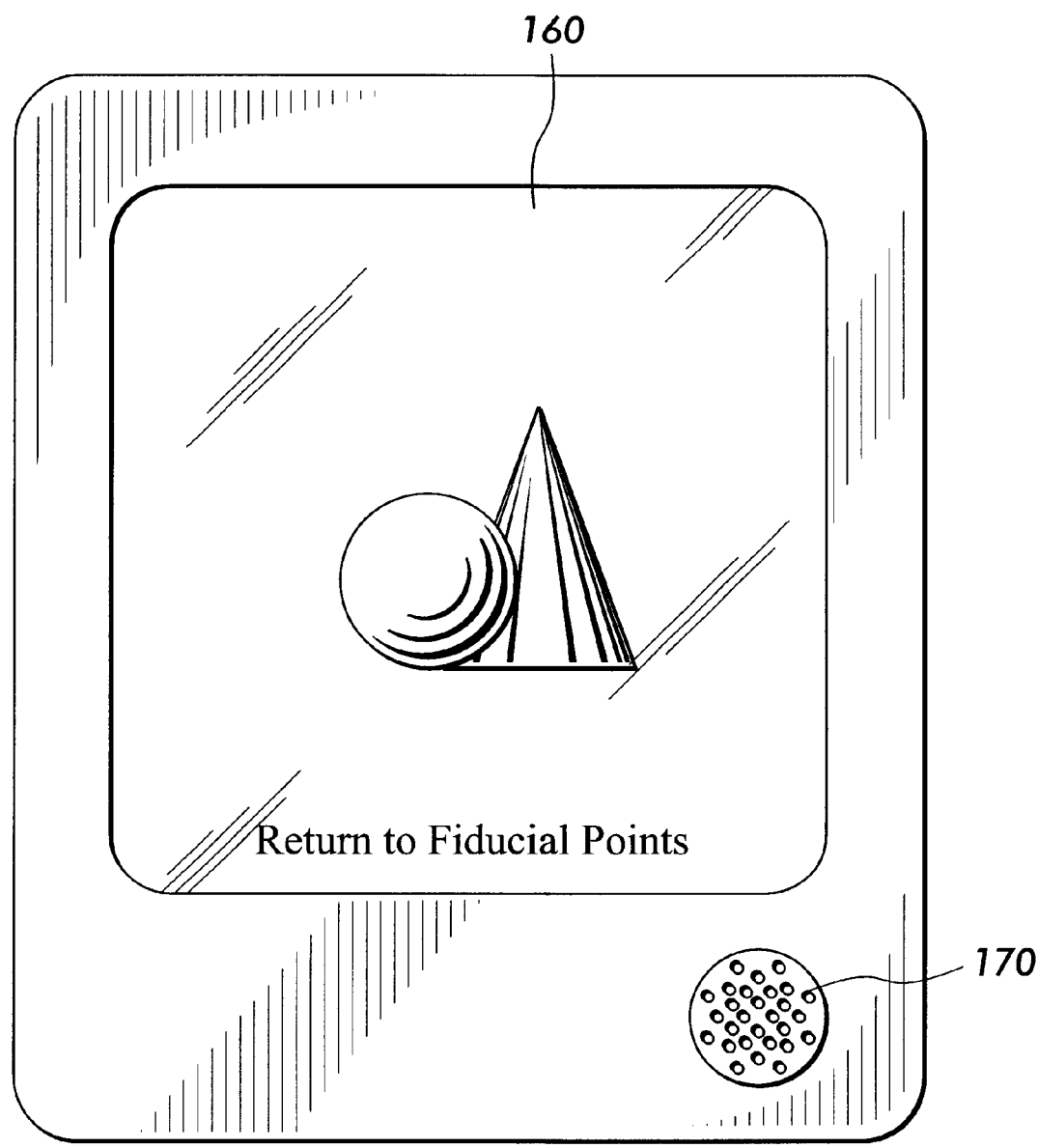
FIG. 3 is a diagram of one embodiment of the invention in which messages to the operator are displayed and/or announced.

Determining the position and orientation of the image pickup device 110 is performed in real time so that feedback can be provided to the image recording device operator through the output device 160. For instance, the operator may fail to move the camera slowly or smoothly enough to maintain registration. Registration is the matching up of previous and current images. As shown in FIG. 3, if registration is lost, the image recording apparatus 100 can provide an instruction to the operator to return to the fiducial points. The fiducial points are those points whose exact locations are known a priori. This instruction may be either visual, auditory, or both. For instance, the image recording apparatus 100 may display the message "Return to Fiducial Points" on display 160, as shown in FIG. 3, and/or may announce a message via the speaker 170.

Likewise, it may be helpful to the operator to obtain a visual feedback of the current path that the operator has traversed. Accordingly, as shown in FIG. 4, in one embodiment of the invention, the processor 120 can output to the display 160 a visual display of dots 162 depicting previously calculated image recording device positions, a curve showing the path traversed, or the like.

Figure 5:
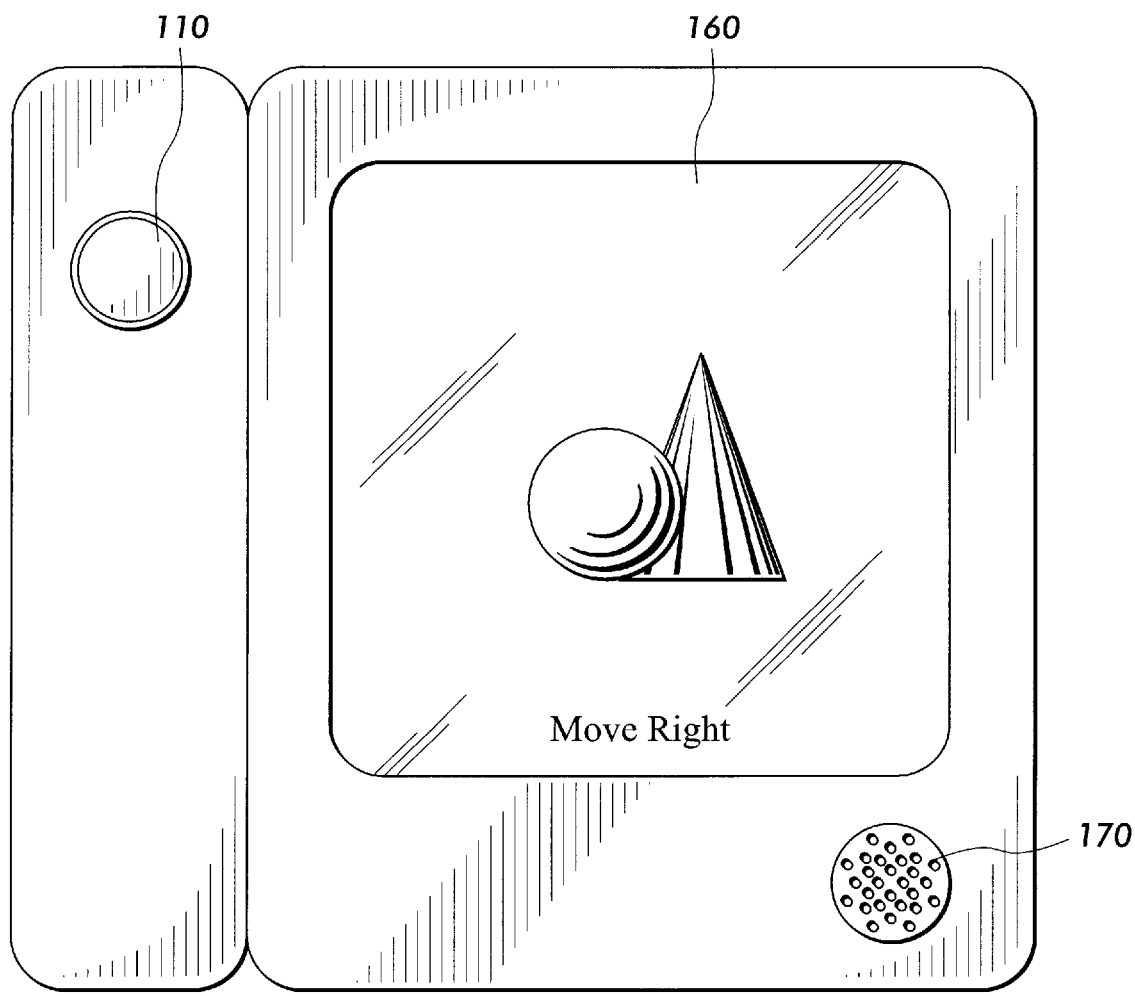
FIG. 5 is a diagram of one embodiment of the invention in which movement instructions are displayed to the operator.

Additionally, as shown in FIG. 5, the image recording apparatus 100 can provide movement instructions on the display 160 to the operator. These movement instructions instruct the operator to move to positions which provide data for parts of the light field which are sparsely sampled. The image recording apparatus 100 can also provide instructions that direct the operator away from areas for which registration is not yet supported by previous frame data.

Figure 4:
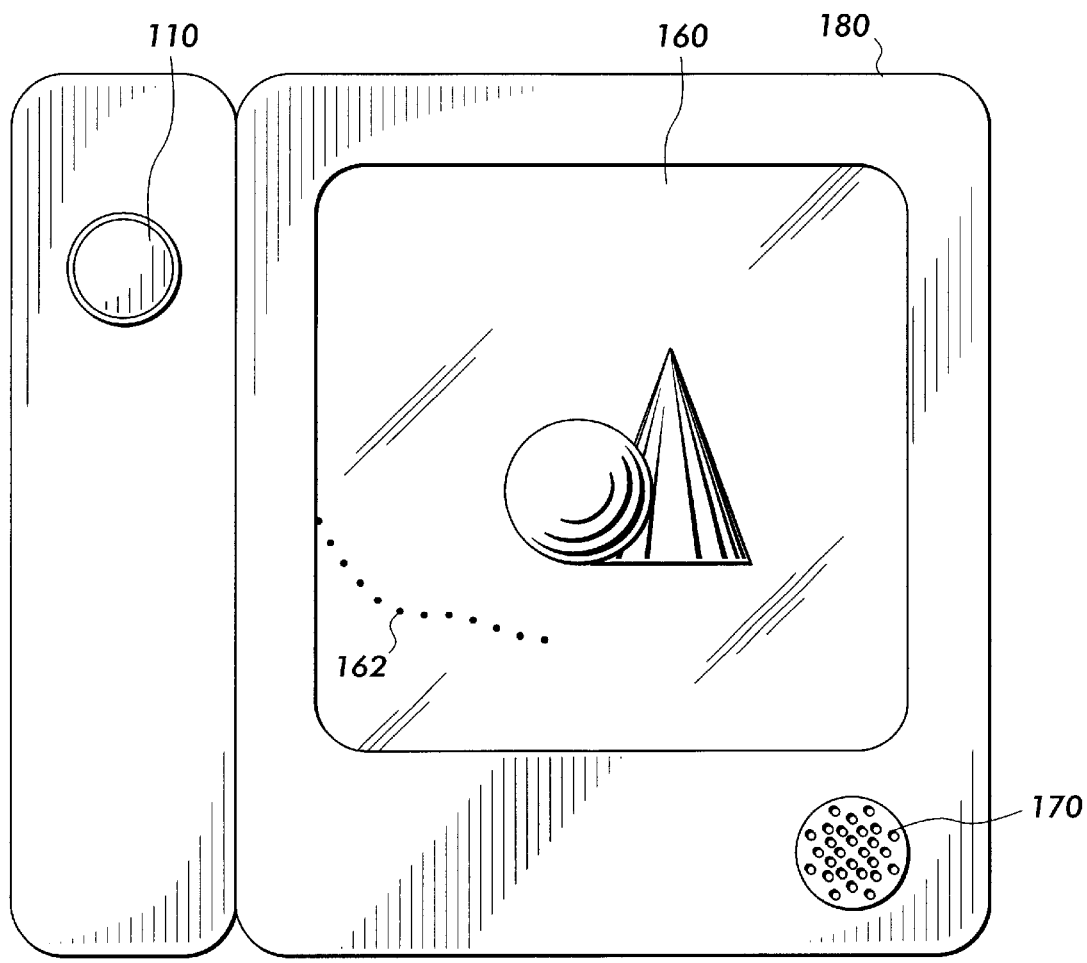
FIG. 4 is a diagram of one embodiment of the invention in which an image pickup device path is displayed.

The elements of the image recording apparatus 100 may be part of a single unit, such that all the elements are housed within a single housing 180, as shown in FIG. 4, or may be distributed, as shown in FIG. 3. For instance, the image recording apparatus 100 may be a single, hand-held image recording apparatus 100 in which the image pickup device 110, the processor 120, the frame storage 130 and the output devices 160 and 170 are housed. Alternatively, the image pickup device 110 may be a video recording device connected via cables to a device, such as a computer or personal digital assistant, that houses the processor 120, the memories 130 and 140 and the output devices 160 and 170. Other combinations may be used to implement the invention, as will be readily apparent to those of ordinary skill in the art.

Figure 6:
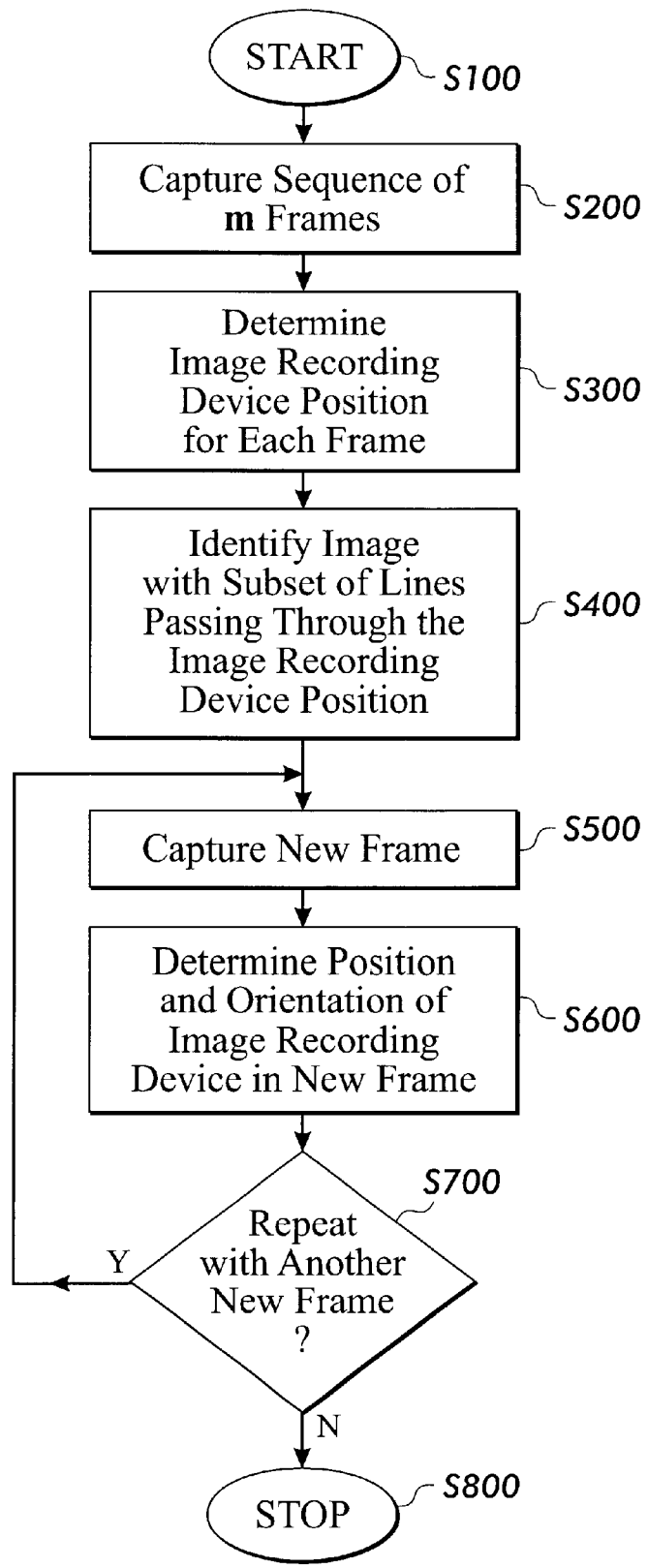
FIG. 6 is a flowchart outlining one embodiment of the method of this invention.

FIG. 6 is a flowchart outlining a preferred method of image recording according to this invention. As shown in FIG. 6, the method starts with step S100.

Then, in step S200, the image recording device captures a sequence of m frames and stores them as a set of pixel lines in the frame storage 130. Next, in step S300, the camera positions, defined as the focal points "p" and "p'", having orientations "o" and "o'", respectively, are determined. A simple way in which to produce a sequence of precisely registered frames with which to begin is to use fiducial points, as discussed above.

To obtain the fiducial points, many different methods may be employed. In a preferred embodiment, the fiducial points may be obtained by building a physical coordinate frame, such as three distinct arrows attached at right angles. The points of the three arrows, the fiducial points, are easy to find in an image. From the fiducial points, the position and orientation of the camera relative to the coordinate frame is determined. The image recording device can then move slowly about the fiducial points and capture the desired images. In this way, an initial light field is obtained. After the initial light field is obtained, it is no longer necessary to maintain the fiducial points in the field of view of the image pickup device 110.

Then, in step S400, for each of these frames, the image is identified with a subset of the set of pixel lines which have been stored in the light field. The sequence of focal points forms a sequence "P" of "m" points along a curve "C" in the three-dimensional free space $R^3$. The curve "C" represents the movement of the camera within the environment.

Next in step S500, the image pickup device 110 obtains a new frame I, i.e., a new subset of lines through some new, unknown focal point p. The goal is to determine p and o by correlating the new frame with previous frames in the light field.

It is important to observe that a line "l" through p and any other point p' in the set "P" is likely to have been captured already, by a previous frame I' corresponding to p' and stored in the light field. Specifically, 1 is captured in both frames I and I' if the image recording device is oriented at p' such that the projection of p onto the image plane of the previous frame I' falls within the previous frame I' and conversely, the image recording device is oriented at p' so that the projection of p' onto the image plane of the new frame I falls within the new frame I. Thus, knowing the correct p and o for the image recording device, the radiance assigned to 1 in I should be identical to the radiance assigned to 1 in I'. The values for p and o correspond to a prediction of the positions of the lines $L=\{l_1, \ldots, l_m\}$ in I and of the radiance at those positions. When m is large, this gives a very precise test for the correct values of p and o.

Then, in step S600, the image recording device position p and orientation o is determined for the new frame. In step S700, the control routine determines whether operation should be repeated for a new image frame. This may be done by either determining if the image pickup device 110 is still recording, determining if the image pickup device 110 has moved, and the like. If the operation is to be repeated, control returns to step S500. Otherwise, control continues to step S800 where the control routine stops.

Figure 7:
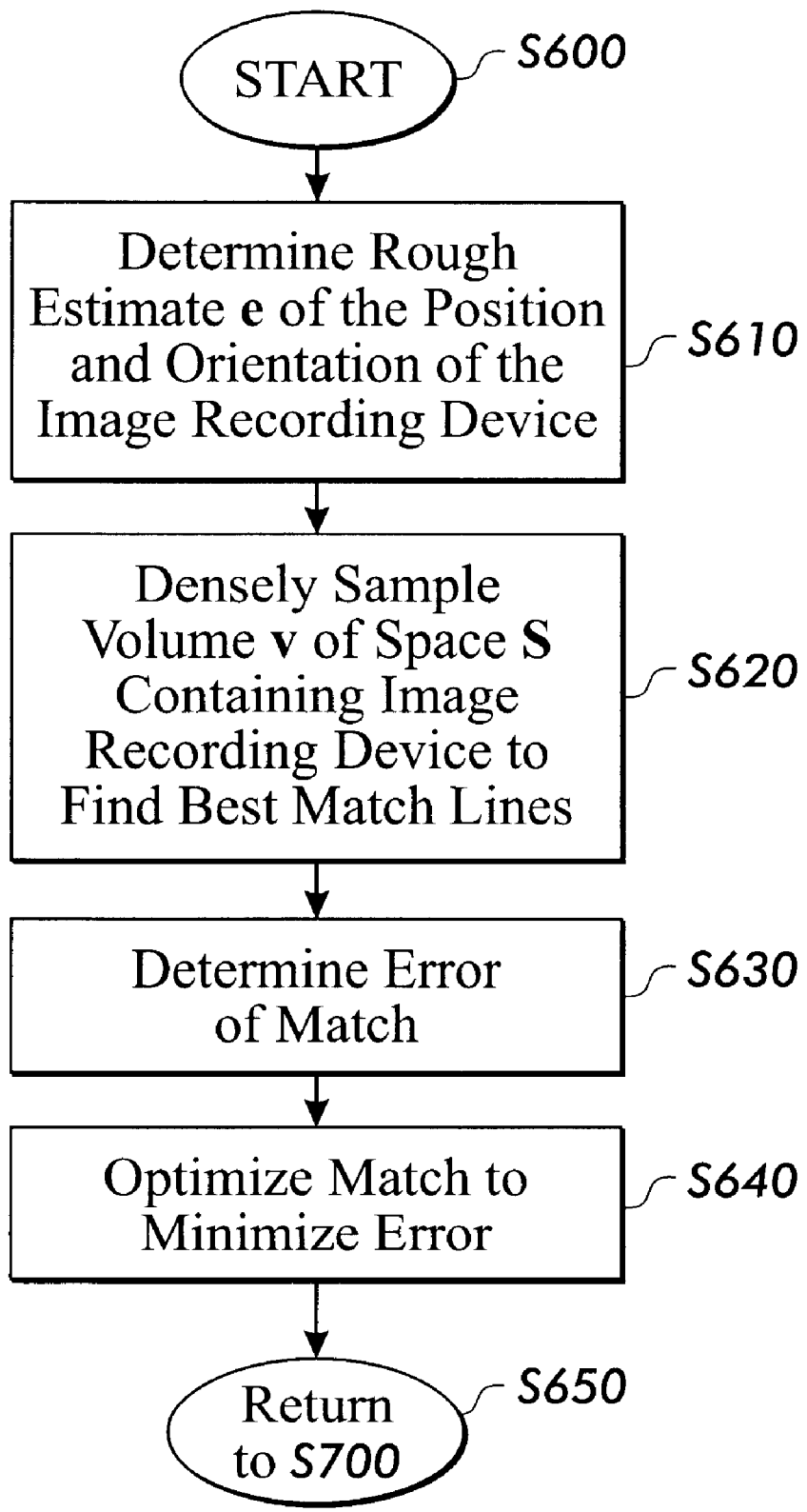
FIG. 7 is a flowchart showing in greater detail the new frame position and orientation determining step of FIG. 6.
Figure 8:
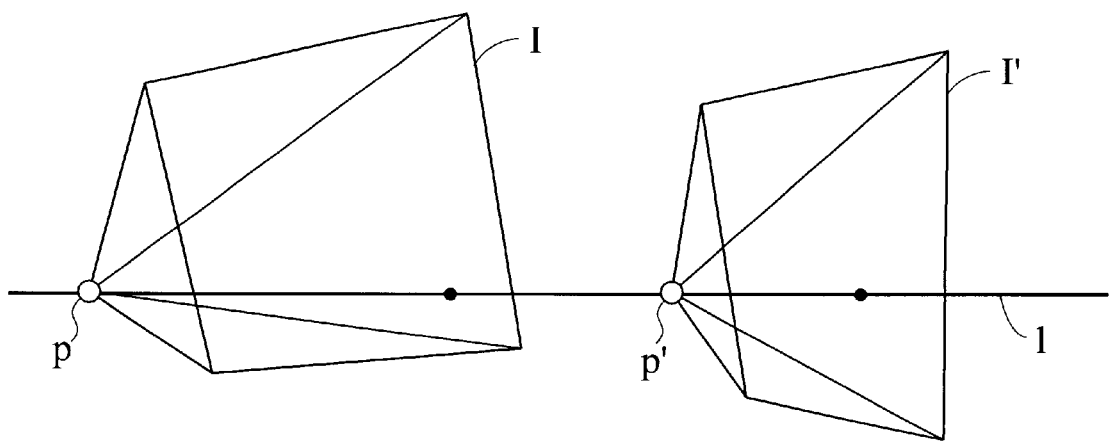
FIG. 8 shows two frames along a curve of the movement of an image recording apparatus.

FIG. 7 shows the position and orientation determination step S600 in greater detail. In particular, starting from step S600, control continues to step S610. In step S610, a rough estimate "e" of the position p and the orientation o are determined by identifying a small volume "v" of a space "S" which is likely to contain the image pickup device 110. The space S is a six-dimensional space of possible positions for the image pickup device 110.

In step S610, to get the rough estimate e of the image recording device's position and orientation, some assumptions about the motion of the image pickup device 110 are made. If the image pickup device 110 does not move too fast, the position p cannot be too different from the previous position p'. If the image pickup device 110 does not change its translational or rotational trajectory suddenly, the new position p should roughly extrapolate some number of previous positions p'. These assumptions are likely to be good since the operator knows that he/she is trying to capture an image for later reconstruction of the environment and is likely to operate the image pickup device 110 accordingly.

Traditional methods may also be used to obtain a rough estimate of the position p in the new frame I. For instance, the optical flow (interpreting the difference between two images as a motion of a set of points of constant radiance) between the previous frame I' and the current frame I is not expensive to compute and can give an estimate of the motion of the image pickup device 110. Likewise, the point correspondence method may be used to obtain a rough estimate of the image pickup device's position.

Then, in step S620, the volume v is densely sampled to find a close match to the image. In step S620, given the rough estimate e in the space S, a small surrounding volume of S is sampled to find a point or pixel which best matches one or more lines in I to corresponding lines stored in the light field. Next, in step S630, the error of the match is determined as a function "F" on points of the space S. The value of F at a point "s" in the space S is the difference between the predicted radiance of the portion of L overlapping I, when I is assumed to lie at s, and the observed values of the corresponding points I. The differences are to allow for the existence of outliers, to account for random image noise, but to require fairly precise matching of non-outliers, which should suffer only from quantization error.

Lastly, in step S640, the result is optimized to provide a close fit. In step S640, the match is optimized to minimize the error in order to provide the closest correspondence. In step S650, control returns to step S700.

Thus, in the present invention, the position of an image recording device can be accurately tracked by correlating radiance lines in a newly captured frame with radiance lines in a previously captured light field.

These correlated frames may then be added to the existing light field in order to enlarge the light field. The addition of these frames to the light field may be performed dynamically as frames are being captured or may be performed off-line. In this way, the light field may be preprocessed off-line before use in further camera tracking and image recording.

Furthermore, this process of adding frames to the initial light field may be repeated in order to obtain larger and large light fields. In this way, entire environments may be captured for later reconstruction.

Using the tracking of the present invention, it is not necessary to maintain fiducial points in the image frame once the initial light field has been obtained. After the initial light field is obtained, tracking is accomplished by correlating radiance lines in a new frame with those in the light field. This allows the image recording apparatus to be used in a much larger environment.

As shown in FIG. 4, the image recording apparatus 100 is preferably implemented using a programmed general purpose computer. However, the image recording apparatus 100 can also be implemented using a special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which a finite state machine capable of implementing the flowchart shown in FIGS. 6 and 7 can be used to implement the image recording of this invention.

While the invention has been described as using fiducial points to obtain an initial light field, it is not limited to such an arrangement. The initial light field may be obtained using a gantry type device, the point correspondence method, or any other method readily apparent to one of skill in the art.

While this invention has been described with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image recording apparatus comprising:
   an image pickup device that acquires images of the surrounding environment, the images being a sequence of frames;
   a frame storage that stores the sequence of frames acquired by the image pickup device; and
   a processor that determines a position and an orientation of the image pickup device based on the sequence of frames, wherein
   the frames comprise a plurality of lines and the processor determines the position of the image pickup device by correlating a radiance along at least one of the plurality of lines in a current frame with the radiance along corresponding ones of the plurality of lines of at least one previous'frame in the sequence of frames.

2. The image recording apparatus of claim 1, wherein the processor determines an initial light field from the sequence of frames stored in the frame storage.

3. The image recording apparatus of claim 2, wherein the processor correlates a radiance along at least one of the plurality of lines in a current frame with the radiance along corresponding ones of the plurality of lines of the initial light field to determine the position and the orientation of the image pickup device.

4. The image recording apparatus of claim 3, wherein, after the position and orientation of the image pickup device is determined, the processor adds the current frame to the initial light field.

5. The image recording apparatus of claim 4, wherein the processor adds the current frame to the initial light, field during times when the image pickup device is not acquiring frames.

6. The image recording apparatus of claim 1, wherein said image pickup device is a hand-held camera.

7. The image recording apparatus of claim 1, further comprising an interactive display that displays a current frame through the image pickup device and that provides instructions and information to an operator of the image recording apparatus.

8. The image recording apparatus of claim 7, wherein the interactive display provides instructions for positioning the image pickup device.

9. The image recording apparatus of claim 7, wherein the interactive display provides information about a path currently traversed by the operator.

10. The image recording apparatus of claim 7, wherein the image pickup, the frame storage, the processor and the interactive display are contained in a single housing.

11. The image recording apparatus of claim 7, wherein the image pickup, the frame storage, the processor and the interactive display are portions of a distributed computer system.

12. The image recording apparatus of claim 7, further comprising an audio output device that outputs audio information designating a path currently traversed by the operator.

13. The image recording apparatus of claim 1, further comprising an audio output device that outputs audio instructions for positioning the image pickup device.

14. The image recording apparatus of claim 1, further comprising an audio output device that outputs audio instructions and information to an operator of the image recording apparatus.

15. A method of determining a position and an orientation of an image recording apparatus, comprising:
   recording a sequence of image frames;
   determining the position and the orientation of the image recording apparatus for each frame of the sequence of frames;
   providing registration feedback to an image recording device operator in real time;
   recording a new image frame;
   determining the position and orientation of the image recording apparatus for the new image frame based on the position and orientation of the image recording apparatus for frames in the sequence of image frames.

16. The method of claim 15, wherein determining the position and the orientation of the image recording apparatus for each frame of the sequence of frames comprises determining the position and the orientation of the image recording apparatus relative to fiducial points.

17. The method of claim 15, wherein determining the position and the orientation of the image recording apparatus for the new image frame comprises locating at least one line coincident in at least one image frame of the sequence of image frames and in the new image frame, the at least one located line having a radiance that is substantially identical in the at least one image frame of the sequence of image frames and in the new image frame.

18. The method of claim 15, further comprising determining an initial light field from the sequence of image frames.

19. The image recording apparatus of claim 18, wherein the step of determining the position and orientation of the image recording apparatus for a new image frame includes correlating a radiance along at least one line in the new image frame with the radiance along a corresponding line of the initial light field.

20. The image recording apparatus of claim 19, wherein, after the position and orientation of the image recording apparatus is determined, the new image frame is added to the initial light field.

21. The image recording apparatus of claim 20, wherein the new image frame is added to the initial light field during times when the image recording apparatus is not recording image frames.

* * * * *